United States Patent [19]
Drake et al.

[11] Patent Number: 6,080,901
[45] Date of Patent: Jun. 27, 2000

[54] ZEOLITE BASED CATALYST CONTAINING ZINC, BORON AND PHOSPHORUS AND METHOD OF MAKING SUCH ZEOLITE BASED CATALYST

[75] Inventors: Charles A. Drake, Nowata; An-hsiang Wu; Jianhua Yao, both of Bartlesville, all of Okla.

[73] Assignee: Phillips Petroleum Company, Bartlesville, Okla.

[21] Appl. No.: 09/399,701

[22] Filed: Sep. 21, 1999

Related U.S. Application Data

[62] Division of application No. 09/057,048, Apr. 8, 1998, Pat. No. 5,981,418.

[51] Int. Cl.[7] ................................................. C07C 4/02
[52] U.S. Cl. ................................................. 585/407; 585/653
[58] Field of Search ...................................... 585/407, 653

[56] References Cited

U.S. PATENT DOCUMENTS

| | | | |
|---|---|---|---|
| 4,049,573 | 9/1977 | Keading | 252/432 |
| 4,067,920 | 1/1978 | Keading | 260/671 |
| 4,159,282 | 6/1979 | Olson et al. | 585/481 |
| 4,652,691 | 3/1987 | Melville et al. | 585/467 |

*Primary Examiner*—Tom Dunn
*Attorney, Agent, or Firm*—Kameron D. Kelly

[57] ABSTRACT

A novel composition including either a zeolite or an acid leached zeolite containing boron, zinc and phosphorus, used in the conversion of hydrocarbons. The novel composition is prepared by a novel method including incorporating into a zeolite or an acid treated zeolite material, preferably by use of a liquid solution, a zinc component, a boron component, and a phosphorus component.

8 Claims, No Drawings

ZEOLITE BASED CATALYST CONTAINING ZINC, BORON AND PHOSPHORUS AND METHOD OF MAKING SUCH ZEOLITE BASED CATALYST

This application is a divisional of application Ser. No. 09/057,048, Apr. 8, 1998, now U.S. Pat. No 5,981,418.

The invention relates to an improved method of making a zeolite based hydrocarbon conversion catalyst having improved properties when compared with certain other zeolite based catalysts.

BACKGROUND OF THE INVENTION

It is known to catalytically crack non-aromatic gasoline boiling range hydrocarbons (in particular paraffins and olefins) to lower olefins (such as ethylene and propylene) and aromatic hydrocarbons (such as benzene, toluene, and xylenes) in the presence of catalysts which contain a zeolite (such as ZSM-5), as is described in an article by N.Y. Chen et al. in Industrial & Engineering Chemistry Process Design and Development, Volume 25, 1986, pages 151–155. The reaction product of this catalytic cracking process contains a multitude of hydrocarbons such as unconverted $C_5+$ alkanes, lower alkanes (methane, ethane, propane), lower alkenes (ethylene and propylene), $C_6$–$C_8$ aromatic hydrocarbons (benzene, toluene, xylenes, and ethylbenzene), and $C_9+$ aromatic hydrocarbons. Depending upon the relative market prices of the individual reaction products, it can be desirable to increase the yield of certain of the more valuable products relative to the others.

One concern with the use of zeolite catalysts in the conversion of hydrocarbons to aromatic hydrocarbons and lower olefins is the excessive production of coke during the conversion reaction. Coke formed during the zeolite catalyzed aromatization of hydrocarbons tends to cause catalyst deactivation. It is desirable to improve processes for the aromatization of hydrocarbons and the formation of lower olefins from hydrocarbons by minimizing the amount of coke formed during such processes. It is also desirable to have a zeolite catalyst that is useful in producing significant quantities of the aromatic and olefin conversion products.

SUMMARY OF THE INVENTION

It is an object of this invention to at least partially convert hydrocarbons to ethylene, propylene and BTX (benzene, toluene, and xylene) aromatics utilizing an improved zeolite based catalyst that has been prepared by a method for preparing such zeolite based catalyst that contains a zinc component, a boron component and a phosphorus component.

Another object of this invention is to provide a method for making an improved zeolite catalyst containing a zinc component, a boron component and a phosphorus component and wherein the improved zeolite catalyst has such desirable properties as providing for lower coke production and favorable production of olefins and BTX aromatics, particularly BTX aromatics, when used in the conversion of hydrocarbons.

The inventive catalyst composition comprises a zeolite or, preferably, an acid treated zeolite, a zinc component, a boron component, and a phosphorus component.

A further embodiment of the invention is a method of making a catalyst for use in converting hydrocarbons by incorporating into a zeolite a zinc component, a boron component, and a phosphorus component to thereby form the catalyst. It is a preferred embodiment of the inventive method to incorporate the zinc, boron and phosphorus components into an acid treated zeolite.

In yet another embodiment of the invention, the catalyst can be used in the conversion of hydrocarbons to aromatics and olefins by contacting it with a hydrocarbon feed under conversion conditions.

Other objects and advantages of the invention will become apparent from the detailed description and the appended claims.

DETAILED DESCRIPTION OF THE INVENTION

The inventive composition comprises a zeolite or zeolite material, preferably a zeolite or zeolite material that has been treated with an acid, a zinc component, a boron component and a phosphorus component. The inventive composition is particularly useful in the conversion of hydrocarbons and is prepared by any suitable method whereby zinc, boron and phosphorus are incorporated into either a zeolite or an acid treated zeolite.

The zeolite starting material of the inventive composition used in the preparation of the inventive composition and in the inventive method of manufacturing the composition of the invention can be any zeolite which is effective in the conversion of non-aromatics to aromatics when contacted under suitable reaction conditions with non-aromatic hydrocarbons. Preferably, the zeolite has a constraint index (as defined in U.S. Pat. No. 4,097,367, which is incorporated herein by reference) in the range of about 0.4 to about 12, preferably about 2–9. Generally, the molar ratio of $SiO_2$ to $Al_2O_3$ in the crystalline framework of the zeolite is at least about 5:1 and can range up to infinity. Preferably, the molar ratio of $SiO_2$ to $Al_2O_3$ in the zeolite framework is about 8:1 to about 200:1, more preferably about 12:1 to about 100:1. Preferred zeolites include ZSM-5, ZSM-8, ZSM-11, ZSM-12, ZSM-35, ZSM-38, and mixtures thereof. Some of these zeolites are also known as "MFI" zeolites. The presently more preferred zeolite is ZSM-5.

The zeolite starting material may be treated with an acid by any suitable means or method for giving an acid treated zeolite. It is preferred for the zeolite to be soaked with an acid solution by any suitable means known in the art for contacting the zeolite with such acid solution. The acid solution used to treat the zeolite can be a solution of any acid that suitably provides for the leaching of aluminum atoms from the zeolite particles. Preferably, the acid concentration in this solution is about 1–10 equivalents per liter. Examples of such suitable acids include sulfuric, phosphoric, nitric and hydrochloric. The preferred acid solution is aqueous hydrochloric acid. The zeolite is soaked in the acid solution (preferably at a temperature of about 50–100° C.) for a period upwardly to about 15 hours, but, preferably from 0.1 hour to 12 hours. After soaking, the resultant acid treated zeolite is washed free of the acid and then can be dried or calcined, or both.

An important aspect of this invention is the incorporation of zinc, boron and phosphorus into either a zeolite or a zeolite that has been acid treated to provide the novel composition. The zinc, boron and phosphorus incorporated into either the zeolite or acid treated zeolite can be in any form which will provide a catalyst comprising a zeolite, zinc, boron and phosphorus or a catalyst composition comprising an acid treated zeolite, zinc, boron and phosphorus.

The incorporation of the zinc component, boron component and phosphorus component into the zeolite or acid treated zeolite may be done by any suitable method or means known in the art for incorporating elements into a substrate material. The zinc component, boron component, and phosphorus component can be incorporated into the zeolite or acid leached zeolite by individual incorporation steps by which the components are individually and separately incorporated into the zeolite or acid treated zeolite or by any combination of simultaneous incorporation steps by which any two or more of the components are incorporated into the zeolite or acid treated zeolite.

A presently preferred method for incorporating the zinc, boron and phosphorus components into the zeolite or acid treated zeolite is to simultaneously incorporate the zinc, boron and phosphorus elements into the zeolite or acid treated zeolite by use of a liquid impregnation solution containing a concentration of zinc, boron and phosphorus. The simultaneous incorporation of all three components provides certain economic advantages over alternative methods of manufacturing the catalyst by reducing the number of incorporation steps required to prepare the novel catalyst.

Another method for manufacturing the novel catalyst is to simultaneously incorporate the zinc and boron elements into the zeolite or acid treated zeolite followed by a steam treatment and a second incorporation step whereby the phosphorus element is incorporated into the zeolite or acid treated zeolite.

The most preferred single step method of incorporating zinc, boron and phosphorus into the zeolite or acid treated zeolite is by using an aqueous impregnation solution into which is dissolved suitable compounds containing zinc, boron and phosphorus. This incorporation method more specifically may be any standard incipient wetness technique known in the art.

The zinc, zinc component or zinc element incorporated into the zeolite or acid treated zeolite can be elemental zinc or zinc compounds, including inorganic zinc compounds, organic zinc compounds and mixtures of any two or more thereof. Examples of potentially suitable zinc containing compounds for incorporating into the zeolite or acid treated zeolite include: zinc acetate dihydrate, zinc acetylacetonate hydrate, zinc bromide, zinc carbonate hydroxide, zinc chloride, zinc borate, zinc silicate zinc aluminate, zinc chromite, zinc cyclohexanebutyrate dihydrate, zinc 2-ethylhexanoate, zinc fluoride, zinc hexafluoroacetylacetonate dihydrate, zinc iodide, zinc molybdate, zinc naphthenate, zinc nitrate hexahydrate, zinc oxide, zinc perchlorate hexahydrate, zinc phosphate hydrate, zinc phosphide, zinc protoporphyrin, zinc sulfate monohydrate, zinc sulfide, zinc telluride, zinc tetrafluoroborate hydrate, zinc titanate, and zinc trifluoromethanesulfonate. The particularly preferred zinc compounds are salts of zinc. The most preferred zinc compound is hydrated zinc nitrate.

The phosphorus, phosphorus component or phosphorus element incorporated into the zeolite or acid treated zeolite can be elemental phosphorus or phosphorus compounds, including phosphates such as $(NH_4)H_2PO_4$, $(NH_4)_2HPO$, $(NH_4)_3PO_4$, $(NH_4)_4P_2O_7$, corresponding phosphates and pyrophosphates of lithium, sodium, potassium, cesium, $H_3PO_4$ and $H_3PO_3$. The preferred phosphorus compounds are those that are soluble in water.

The boron, boron component or boron element that is incorporated into the zeolite or acid treated zeolite can be elemental boron or boron compounds, including inorganic boron compounds, organic boron compounds and mixtures of any two or more thereof. Examples of potentially suitable boron containing compounds for incorporating into the zeolite or acid treated zeolite include: boric acid, boron bromide, boron carbide, boron fluoride, boron nitride, boron oxide, carborane, N,N-dimethylanilinium tetra (pentafluorophenyl)borate, methyl oxazaborolidine, nitronium tetrafluoroborate, phenylboron dichloride, phenylboron dihydroxide, potassium dodecahydrododecaborate hydrate, potassium tri-sec-butylborohydride, sodium cyanoborohydride, tetrafluoroboric acid, tri-n-amylborate, B-triboromoborazine, tri-n-butylborate, B-trichloroborazine, triethanolamineborate, triethylborate, triethylboron, trimethyoxyboroxine, trimethylborate, trimethylboron, triphenylboron, triphenylboron sodium hydroxide, tris(pentafluorophenyl)boron, tris(trimethylsiloxy)boron, triethylammonium dodecahydrododecaborate, bis(pinacolata)diboron, and borane complexes. The preferred boron containing compounds are those that are soluble in either water or hydrocarbon. The most preferred boron containing compound for use in this invention is boric acid.

The preferred solution of zinc, boron and phosphorus for incorporating into the zeolite or acid treated zeolite is an aqueous solution of hydrated zinc nitrate, boric acid and phosphoric acid. The amount of hydrated zinc nitrate in the aqueous impregnation solution can range from 0.1 parts by weight of the solution to 20 parts by weight of the solution. The amount of boric acid in the aqueous impregnation solution can range from 0.1 to 10 parts by weight of the solution, and the amount of phosphoric acid in the aqueous impregnation solution can range from 0.1 to 10 parts by weight of the solution. The water in the aqueous solution can range from 50 to 99.5 parts by weight of the solution.

The relative amounts of zinc, boron and phosphorus incorporated or impregnated into the zeolite or acid treated zeolite should be such as to give concentrations effective in providing the desirable properties of favorable aromatics and olefins conversion yields with low coke production when the inventive composition is employed in the conversion of a hydrocarbon feed. It has been found that the incorporation of the three components of zinc, boron and phosphorus into the zeolite or acid treated zeolite gives a hydrocarbon conversion catalyst that provides an improvement in aromatics yield over certain other zeolite catalysts containing zinc and boron only.

The atomic weight percent of zinc present in the impregnated zeolite or acid treated zeolite is generally in the range upwardly to about 20 atomic weight percent of the impregnated zeolite or acid treated zeolite. The preferred concentration of zinc in the impregnated acid treated zeolite is in the range of from about 0.05 to about 15 atomic weight percent and, most preferably, from 0.1 to 10 atomic weight percent. As used in this specification and claims, the term "atomic weight percent" means the weight of the referenced element, i.e., zinc, boron, or phosphorus, on an atomic basis, whether such element is in its elemental form or is a part of a molecular structure or is incorporated in the matrix material of the catalyst composition, with such weight being divided by the total weight of the catalyst composition and multiplied by the value one hundred (100).

The boron should generally be present in the impregnated zeolite or acid treated zeolite in the range upwardly to about 8 atomic weight percent of the impregnated zeolite or acid treated zeolite. Preferably, the concentration of boron in the impregnated acid treated zeolite is in the range of from about 0.1 to about 6 atomic weight percent and, most preferably, from 0.2 to 5 atomic weight percent.

Phosphorus should generally be present in the impregnated zeolite or acid treated zeolite in the range upwardly to about 10 atomic weight percent of the impregnated zeolite or acid treated zeolite. Preferably, the concentration of phosphorus in the impregnated zeolite or acid treated zeolite is in the range of from about 0.1 to about 8 atomic weight percent and, most preferably from 0.2 to 6 atomic weight percent.

The zeolite or acid treated zeolite having incorporated therein a zinc component, a boron component and a phosphorus component can be further subjected to a steam treatment whereby it is exposed by any suitable method known in the art to an atmosphere of steam under process conditions that suitably provide a steam treated catalyst. The zeolite with zinc, boron and phosphorus or acid treated zeolite with zinc, boron and phosphorus is exposed to a predominantly gaseous atmosphere, preferably an entirely gaseous atmosphere, comprising steam. The steam atmosphere preferably has a concentration of steam exceeding 90 molar percent and, most preferably, the concentration of steam of the steam atmosphere exceeds 95 molar percent.

The steam treatment may be conducted at any pressure and temperature conditions that suitably provide steam treated material. Generally, the steam treatment may be conducted at a pressure of from below atmospheric upwardly to about 1000 pounds per square inch absolute (psia). More typical pressures, however, are in the range of from about atmospheric to about 100 psia. The stream treatment temperature is generally in the range of from about 100° C. to about 1000° C. Preferably, this temperature range is from about 100° C. to about 800° C. and, most preferably, the steam treatment temperature is in the range of from 100° C. to 600° C.

The time period for conducting the steam treatment step must be sufficient to provide a suitably treated steam treated acid treated zeolite containing zinc, boron and phosphorus or a suitably treated steam treated zeolite containing zinc, boron and phosphorus. Generally, the period for exposing the zeolite containing zinc, boron and phosphorus or the acid treated zeolite containing zinc, boron and phosphorus to the atmosphere of steam at appropriate temperature conditions can range from about 0.1 hour to about 30 hours. Preferably, the steam treatment step is conducted for a period of from about 0.25 hour to about 25 hours and, most preferably, from 0.5 hour to 20 hours.

Another embodiment of the inventive method includes a multiple step method in which the zinc component and the boron component are first combined or incorporated into a zeolite or an acid treated zeolite followed by steam treating the resultant intermediate and thereafter incorporating the phosphorus component into the steam treated intermediate.

The zinc component and boron component can be combined with the zeolite or acid treated zeolite in any suitable manner known to those skilled in the art including dry mixing of a zinc component, a boron component and either a zeolite or an acid treated zeolite to form a mixture or incorporating a zinc component and a boron component into either a zeolite or an acid treated zeolite, preferably by impregnation, to give a catalyst intermediate.

The dry mixed mixture is agglomerated into an agglomerate by any suitable method known by those skilled in the art. Suitable methods for forming the agglomerate include molding, tabletting, pressing, pelletizing, extruding, tumbling and densifying. It is preferred for the dry mixed mixture to be made into a paste suitable for extrusion, for example, by the addition of water or any other suitable liquid.

As mentioned earlier, it is preferred for either a zeolite or an acid treated zeolite to have incorporated therein the zinc and boron components by impregnation. The impregnation solution is preferably an aqueous solution of suitable boron and zinc compounds. The concentrations of zinc and boron in the solution and the amount of solution impregnated into the zeolite or acid treated zeolite should be such as to provide a catalyst intermediate and a final catalyst having the concentration of zinc and boron as described in detail elsewhere herein.

The intermediates containing either a zeolite or an acid treated zeolite both having a zinc component and a boron component are further treated and a phosphorus component is added to give the desired inventive catalyst. Both the intermediate agglomerate and catalyst intermediate are steam treated under conditions as described above to respectively give a steam treated agglomerate and a steam treated intermediate. Incorporated into the steam treated agglomerate and steam treated intermediate is a phosphate component. The incorporation of the phosphate component may be done by any suitable method including impregnation by standard incipient wetness techniques or by soaking in a solution containing a phosphorus. The amount of phosphorus incorporated should be such that the concentration of phosphorus in the final catalyst is as described in detail elsewhere herein.

The catalyst containing a zeolite, a zinc component, a boron component and a phosphorus component or the catalyst containing an acid treated zeolite, a zinc component, a boron component and a phosphorus component both prepared by any of the methods described herein may further be calcined by any standard method known in the art. Preferably, such catalysts are calcined in the presence of an inert gas, a reducing gas or an oxygen-containing gas. It is preferred for the calcination to be conducted in the presence of an oxygen-containing gas at a temperature suitable for achieving the desired degree of calcination, for example, generally in the range of from 200° C. to 1000° C., preferably in the range of from 375° C. to 750° C. and, most preferably, from 500° C. to 700° C.

The calcination step is conducted for a period of time suitable for providing the desired degree of calcination, for example, generally in the range of from about 0.1 hours to about 10 hours, preferably from about 0.25 hours to about 9 hours and, most preferably, from 0.5 hours to 8 hours.

Any suitable hydrocarbon feedstock which comprises paraffins (alkanes) and/or olefins (alkenes) and/or naphthenes (cycloalkanes), wherein each of these hydrocarbons contains 2–16 carbon atoms per molecule can be used as the feed to be contacted with the improved composition under suitable process conditions for obtaining a reaction product comprising lower alkenes containing 2–5 carbon atoms per molecule and aromatic hydrocarbons. Frequently, these feedstocks also contain aromatic hydrocarbons. Non-limiting examples of suitable, available feedstocks include gasolines from catalytic oil cracking (e.g., FCC and hydrocracking) processes, pyrolysis gasolines from thermal hydrocarbon (e.g., ethane, propane, and naphtha) cracking processes, naphthas, gas oils, reformates, straight-run gasoline and the like. The preferred feed is a gasoline-boiling range hydrocarbon feedstock suitable for use as at least a gasoline blend stock generally having a boiling range of about 30–210° C. The content of paraffins may exceed the combined content of olefins, naphthenes and aromatics (if present).

The hydrocarbon feed stream can be contacted by any suitable manner with the improved composition described herein contained within a reaction zone. The contacting step can be operated as a batch process step or, preferably, as a continuous process step. In the latter operation, a solid catalyst bed or a moving catalyst bed or a fluidized catalyst bed can be employed. Any of these operational modes have advantages and disadvantages, and those skilled in the art can select the one most suitable for a particular feed and catalyst.

The contacting step is preferably carried out within a conversion reaction zone, wherein is contained the improved composition, and under reaction conditions that suitably promote the formation of olefins, preferably light olefins, and aromatics, preferably BTX, from at least a portion of the hydrocarbons of the hydrocarbon feed. The reaction temperature of the contacting step is more particularly in the range of from about 400° C. to about 800° C., preferably, from about 450° C. to about 750° C. and, most preferably, from 500° C. to 700° C. The contacting pressure can range from subatmospheric pressure upwardly to about 500 psia, preferably, from about atmospheric to about to about 450 psia and, most preferably, from 20 psia to 400 psia.

The flow rate at which the hydrocarbon feed is charged to the conversion reaction zone is such as to provide a weight hourly space velocity ("WHSV") in the range of from exceeding 0 hour$^{-1}$ upwardly to about 1000 hour$^{-1}$. The term "weight hourly space velocity", as used herein, shall mean the numerical ratio of the rate at which a hydrocarbon feed is charged to the conversion reaction zone in pounds per hour divided by the pounds of catalyst contained in the conversion reaction zone to which the hydrocarbon is charged. The preferred WHSV of the feed to the conversion reaction zone or contacting zone can be in the range of from about 0.25 hour$^{-1}$ to about 250 hour$^{-1}$ and, most preferably, from 0.5 hour$^{-1}$ to 100 hour$^{-1}$.

The following examples are presented to further illustrate this invention and are not to be construed as unduly limiting its scope.

EXAMPLE I

This example illustrates the preparation of several catalysts which were subsequently tested as catalysts in the conversion of a gasoline sample, which had been produced in a commercial fluidized catalytic cracking unit (FCC), to aromatics.

Acid Leached Zeolite

A commercially available ZSM-5 catalyst (provided by United Catalysts Inc., Louisville, Ky., under product designation "T-4480") was treated by acid leaching. To acid leach the catalyst, it was soaked in an aqueous HCl solution, having a concentration of 19 weight percent HCl (approximately 6N), for two hours at a constant temperature of about 90° C. After soaking, the catalyst was separated from the acid solution and thoroughly washed with water and dried. The acid soaked, washed and dried catalyst was calcined at a temperature of about 525° C. for four hours.

Catalyst A (Control)

A 10.00 gram quantity of the above-described acid leached ZSM-5 catalyst was impregnated by an incipient wetness technique with a 10 gram quantity of a solution containing 5.4 parts by weight hydrated zinc nitrate (Zn(NO$_3$)$_2$.6H$_2$O), 2.25 parts by weight boric acid (H$_3$BO$_3$), and 42.35 parts by weight water. The impregnation solution had an atomic ratio of boron to zinc of 2.005. This impregnated, acid leached zeolite was then dried in air at a temperature of 125° C. for 16 hours followed by treatment in a steam atmosphere for 6 hours at 650° C. The steam treated material was then exposed to a helium gas atmosphere at a temperature of 538° C. for 2 hours. The final product contained 2.314 weight percent zinc and 0.767 weight percent boron.

Catalyst B (Invention)

A homogeneous mixture was prepared by adding to 10 parts by weight of the above described acid leached zeolite, by way of a single solution, 0.5 parts by weight hydrated zinc nitrate (Zn(NO$_3$)$_2$.6H$_2$O), 0.1 parts by weight boric acid (H$_3$BO$_3$), 0.19 parts by weight phosphoric acid (H$_3$PO$_4$), and 7.0 parts by weight water. The mixture was treated in a steam atmosphere for 6 hours at 650° C.

EXAMPLE II

This example illustrates the use of the catalyst described in Example I as catalysts in the conversion of a gasoline feed to benzene, toluene and xylenes (BTX) and lower olefins (ethylene, propylene).

For each of the test runs, a 5.0 g sample of the catalyst materials described in Example I was placed into a stainless steel tube reactor (length: about 18 inches; inner diameter: about 0.5 inch). Gasoline boiling range feedstock from a catalytic cracking unit of a refinery was passed through the reactor at a flow rate of about 14 ml/hour, at a temperature of about 600° C. and at atmospheric pressure (about 0 psig). The formed reaction product exited the reactor tube and passed through several ice-cooled traps. The liquid portion remained in these traps and was weighed, whereas the volume of the gaseous portion which exited the traps was measured in a "wet test meter". Liquid and gaseous product samples (collected at hourly intervals) were analyzed by means of a gas chromatograph. Results of two test runs for Catalysts A and B are summarized in Table I. All test data were obtained after 8 hours on stream.

TABLE I

| Catalyst | BTX Yield (wt. %) | Light Olefin Yield* (wt. %) | Sum of BTX and olefin (wt. %) | Coke (% per hr.) |
|---|---|---|---|---|
| A (Control) | 39 | 20.7 | 59.6 | 0.3 |
| B (Invention) | 47 | 18.4 | 65.4 | 0.4 |

*Ethylene & Propylene

The test data presented in Table I show that the inventive catalyst provides a BTX product yield that is considerably greater than the BTX product yield for the control catalyst. Thus, the simultaneous addition of zinc, boron and phosphorus by way of a solution of Zn(NO$_3$)$_2$, H$_3$BO$_3$ and H$_3$PO$_4$ to an acid leached zeolite provides a catalyst having more desirable catalytic properties than an acid leached zeolite containing only zinc and boron.

EXAMPLE III

This example illustrates the preparation of the inventive catalyst comprising a zeolite, a zinc component, a boron component, and a phosphorus component by a method that is different from the one described in Example I. Also illustrated is a preparation of comparative catalysts that contain a zinc component and a boron component but not a phosphorus component.

Catalyst C (Control)

An 18 gram quantity of commercially available ZSM-5, Zeocat PZ2/50H powder (provided by Chemie Uetikon), was mixed with 7 grams of bentonite and 0.4 grams hydrated zinc borate (Zn$_3$B$_4$O$_9$.5H$_2$O) to form a mixture. Water was then added to the mixture in an amount so as to provide for an extrudable paste which was extruded, dried and steam treated in a steam atmosphere for 4 hours at 650° C.

Catalyst D (Control)

An 18 gram quantity of the zeolite-material described for Catalyst C was mixed with 7 grams of bentonite and 0.4 grams of zinc hexaborate to form a mixture. Water was then added to the mixture in an amount so as to provide for an extrudable paste which was extruded and dried. The extrudate was treated in a steam atmosphere for 4 hours at 650° C.

Catalyst E (Invention)

A 10 gram quantity of the above described Catalyst C was impregnated using an incipient wetness technique with a solution containing 0.6 grams triethylphosphate, $(CH_3CH_2O)_3$ PO, dissolved in 20 grams hexane. After letting the impregnated Catalyst E stand for a time period, the solvent was evaporated from the catalyst, and the catalyst was calcined in air at a temperature of 530° C. for 3 hours.

Table II presents the approximate concentrations of zinc, boron and phosphorus of Catalysts C, D, and E.

TABLE II

| | Zinc (wt %) | Boron (wt %) | Phosphorus (wt %) |
|---|---|---|---|
| Catalyst C (Control) | 0.42 | 0.21 | None |
| Catalyst D (Control) | 0.6 | 0.15 | None |
| Catalyst E (Invention) | 0.42 | 0.21 | 1 |

This example illustrates the use of the catalysts described in Example III as catalysts in the conversion of a gasoline feedstock to BTX and lower olefins. The reaction method conducted for Catalysts C, D and E was substantially identical to the one described in Example II above.

TABLE III

| Catalyst | BTX Yield (wt. %) | Light Olefin Yield* (wt. %) | Coke (% per hr.) |
|---|---|---|---|
| Catalyst C | 43.5 | 18.5 | 0.35 |
| Catalyst D | 36.2 | 22.6 | 0.20 |
| Catalyst E | 33.1 | 21.5 | 0.16 |

*Propylene & Ethylene

The test data presented in Table III show that the inventive Catalyst E provides for a significantly lower coking rate than the comparative Catalysts C and D with an acceptable light olefin and BTX yield. This improvement is achieved with the addition of the phosphorus component to the catalyst system which contains only boron and zinc components.

EXAMPLE V

This example illustrates another method for preparing the inventive catalyst comprising an acid leached zeolite, a zinc component, a boron component, and a phosphorus component. The preparation of another comparative catalyst that contains a zinc component and a boron component but not a phosphorus component is also presented.

Catalyst F (Control)

A 10 gram quantity of acid leached zeolite catalyst was impregnated with 0.54 grams of hydrated zinc nitrate (Zn$(NO_3)_2 \cdot 6H_2O$) and 9 grams of 5 weight percent boric acid ($H_3BO_3$). The impregnated acid leached zeolite catalyst was treated in a steam atmosphere for 6 hours at 650° C.

Catalyst G (Invention)

A 10 gram quantity of Catalyst F that had been subjected to a second steam treatment in a steam atmosphere for 4 hours at 650° C. was soaked in a solution of 3 grams ammonium phosphate dissolved in 50 ml of water at a temperature of 60° C. for 4 hours. The liquid was then decanted. The resulting solid was washed with 100 ml of water, dried and calcined at a temperature of 500° C. for 3 hours.

EXAMPLE VI

This example illustrates the use of the catalysts described in Example V as catalysts in the conversion of a gasoline feedstock to BTX and lower olefins. The reaction method conducted for Catalysts F and G was substantially identical to the one described in Example II above.

TABLE IV

| Catalyst | BTX Yield (wt. %) | Light Olefin Yield* (wt. %) | Coke (% per hr.) |
|---|---|---|---|
| Catalyst F | 38 | 23.3 | 0.2 |
| Catalyst G | 48 | 16.1 | 0.2 |

*Ethylene & Propylene

The test data presented in Table IV show that the inventive catalyst provides a BTX product yield that is considerably greater than the BTX product yield for the control catalyst. The two-step method for preparing the inventive catalyst of first simultaneously adding zinc and boron to an acid leached zeolite followed by the incorporation of phosphorus gives a catalyst having more desirable catalytic properties than the catalyst that does not have a phosphorous component.

Reasonable variations, modifications, and adaptations can be made within the scope of the disclosure and the appended claims without departing from the scope of this invention.

What is claimed is:

1. A process comprising contacting under conversion conditions a hydrocarbon feed comprising hydrocarbons containing 2–16 carbon atoms per molecule with a catalyst composition comprising an acid treated zeolite; a zinc component; a boron component; and a phosphorous component, wherein said catalyst composition has been steam treated, wherein said conversion conditions include a reaction temperature in the range of from 400° C. to about 800° C., a contacting pressure in the range of from subatmospheric upwardly to about 500 psia, a charge rate of said hydrocarbon feed such that the weight hourly space velocity is in the range of from exceeding 0 hour$^{-1}$ upwardly to about 1000 hour$^{-1}$ to thereby provide a conversion product including aromatics and olefins.

2. A process recited in claim 1 wherein in said catalyst composition the amount of zinc present is in the range of upwardly to 20 atomic weight percent of said catalyst composition; the amount of boron present is in the range of upwardly to 8 atomic weight percent of said catalyst composition; and the amount of phosphorus present is in the range of upwardly to 10 atomic weight percent of said catalyst composition.

3. A process as recited in claim 2 wherein in said catalyst composition the amount of zinc present is in the range of from 0.05 to 15 atomic weight percent of said catalyst composition; the amount of boron present is in the range of from 0.1 to 6 atomic weight percent of said catalyst composition; and the amount of phosphorus present is in the range of from 0.1 to 8 atomic weight percent of said catalyst composition.

4. A process as recited in claim 3 wherein in said catalyst composition the amount of zinc present is in the range of from 0.1 to 10 atomic weight percent of said catalyst composition; the amount of boron present is in the range of from 0.2 to 5 atomic weight percent of said catalyst composition; and the amount of phosphorus present is in the range of from 0.2 to 6 atomic weight percent of said catalyst composition.

5. A process comprising contacting under conversion conditions a hydrocarbon feed comprising hydrocarbons containing 2–16 carbon atoms per molecule with a catalyst composition comprising an acid treated zeolite having incorporated therein upwardly to 20 atomic weight percent zinc; upwardly to 8 atomic wright percent boron; and upwardly to 10 atomic weight percent phosphorous, wherein said catalyst composition has been steam treated, wherein said conversion conditions include a reaction temperature in the range of from 400° C. to about 800° C., a contacting pressure in the range of from subatmospheric upwardly to about 500 psia, a charge rate of said hydrocarbon feed such that the weight hourly space velocity is in the range of from exceeding 0 hour$^{-1}$ upwardly to about 1000 hour$^{-1}$ to thereby provide a conversion product including aromatics and olefins.

6. A process as recited in claim 5 wherein zinc is present in said catalyst composition in the range of from 0.05 to 15 atomic weight percent of said catalyst composition; boron is present in said catalyst composition in the range of from 0.1 to 6 atomic weight percent of said catalyst composition; and phosphorus is present in said catalyst composition in the range of from 0.1 to 8 atomic weight percent.

7. A process as recited in claim 5 wherein zinc is present in said catalyst composition in the range of from 0.1 to 10 atomic weight percent of said catalyst composition; boron is present in said catalyst composition in the range of from 0.2 to 5 atomic weight percent of said catalyst composition; and phosphorus is present in said catalyst composition in the range of from 0.2 to 5 atomic weight percent.

8. A process comprising contacting under conversion conditions a hydrocarbon feed comprising hydrocarbons containing 2–16 carbon atoms per molecule with a catalyst composition prepared by incorporating into an acid leached zeolite a liquid solution containing a zinc component, a boron component, and a phosphorus component to form said catalyst composition, and steam treating said catalyst composition wherein said conversion conditions include a reaction temperature in the range of from about 400° C. to about 800° C., a contacting pressure in the range of from subatmospheric pressure upwardly to about 500 psia, a charge rate of said hydrocarbon feed such that the weight hourly space velocity is in the range of from exceeding 0 hour$^{-1}$ upwardly to about 1000 hour$^{-1}$ to thereby provide a conversion product including aromatics and olefins.

* * * * *